(12) United States Patent
Wood (10) Patent No.: US 11,982,366 B2
(45) Date of Patent: May 14, 2024

(54) FLUID FLOW DEVICE

(71) Applicant: OFIP LIMITED, Oxford (GB)

(72) Inventor: Daniel Wood, Oxford (GB)

(73) Assignee: OFIP Limited, Oxford (GB)

( * ) Notice: Subject to any disclaimer, the term of this patent is extended or adjusted under 35 U.S.C. 154(b) by 69 days.

(21) Appl. No.: 17/792,222

(22) PCT Filed: Jan. 7, 2021

(86) PCT No.: PCT/GB2021/050038
§ 371 (c)(1),
(2) Date: Jul. 12, 2022

(87) PCT Pub. No.: WO2021/144553
PCT Pub. Date: Jul. 22, 2021

(65) Prior Publication Data
US 2023/0034729 A1 Feb. 2, 2023

(30) Foreign Application Priority Data

Jan. 13, 2020 (GB) ..................................... 2000473

(51) Int. Cl.
*F16K 27/02* (2006.01)
*F16K 15/06* (2006.01)

(52) U.S. Cl.
CPC ........ *F16K 27/0209* (2013.01); *F16K 15/063* (2013.01); *F16K 2200/402* (2021.08)

(58) Field of Classification Search
CPC ............... F16K 27/0209; F16K 15/063; F16K 2200/402; F16K 1/465; F16K 17/0426; F16K 17/0466
See application file for complete search history.

(56) References Cited

U.S. PATENT DOCUMENTS 2,790,460 A * 4/1957 Radd ...................... F16K 15/04
137/533.15
3,510,103 A 5/1970 Carsello
(Continued)

FOREIGN PATENT DOCUMENTS

WO 2013068747 A1 5/2013
WO 2019058110 A1 3/2019

OTHER PUBLICATIONS

Notification of Transmittal (Form PCT/ISA/220), International Search Report (Form PCT/ISA/210), and Written Opinion (Form PCT/ISA/237) for International Application No. PCT/GB2021/050038 dated Mar. 29, 2021, 16 pages.

(Continued)

*Primary Examiner* — Patrick C Williams
(74) *Attorney, Agent, or Firm* — Withrow + Terranova, PLLC; Vincent K. Gustafson (57) ABSTRACT

A device for controlling the flow of fluid through a conduit from an upstream side of the device to a downstream side of the device. The device includes a valve seat mounted on a casing that defines a valve aperture, a mounting member arranged on the downstream side of the valve aperture; a valve member mounted on the mounting member. The valve member is arranged to selectively open and close the valve aperture thereby controlling the flow of the fluid through the valve aperture. A seal retaining member is arranged adjacent the valve seat and, with the valve seat, defines a seal retaining groove. A compliant seal within the seal retaining groove seals the valve aperture when the valve member is moved to close the valve aperture.

15 Claims, 3 Drawing Sheets

(56) References Cited

U.S. PATENT DOCUMENTS

| | | | |
|---|---|---|---|
| 4,137,934 A | | 2/1979 | Rice et al. |
| 4,316,598 A | | 2/1982 | Maggio |
| 4,781,213 A | * | 11/1988 | Kilayko ................ F16K 17/285 |
| | | | 137/533.15 |
| 7,444,990 B1 | * | 11/2008 | Fisher ................... F16K 25/005 |
| | | | 123/516 |
| 2004/0118458 A1 | * | 6/2004 | Jungmann ............. F16K 15/063 |
| | | | 137/543 |
| 2014/0191151 A1 | * | 7/2014 | Baumann ................ F16K 1/443 |
| | | | 251/359 |

OTHER PUBLICATIONS

Search Report under Section 17(5) for United Kingdom Patent Application No. GB2000473.5 dated May 11, 2020, 3 pages.

* cited by examiner

FLUID FLOW DEVICE

This application is a 35 U.S.C. § 371 national phase filing of International Application No. PCT/GB2021/050038, filed on Jan. 7, 2021, and claims the benefit of United Kingdom Patent Application No. 2000473.5 filed on Jan. 13, 2020, wherein the entire contents of the foregoing applications are hereby incorporated by reference herein.

The present invention relates to a device for controlling the flow of fluid therethrough, in particular to a device including a valve member for opening and closing a valve aperture to control a flow of fluid through the device.

In fluid flow systems such as pipes and conduits, e.g. as can be found in many different industrial situations, there is a need to regulate the pressure in a fluid flow stream. In such systems there is an input pressure that may be constant or fluctuating in time and which it may be desired to maintain or to control to a lower target output pressure, which can also be constant or fluctuating.

The pressure in such systems may be regulated using a pressure regulator. The flow through the pressure regulator is selectively controlled by a valve member that opens and closes one or more valve apertures, e.g. dependent upon one or more of the pressure in the downstream side of the conduit, the upstream side of the conduit and a control pressure that is arranged to act on the valve member.

In such pressure regulators a seal between the valve member and the housing of the pressure regulator helps to minimise the leakage of fluid through the valve apertures when the valve apertures are fully closed by the valve member, i.e. at "shut-off".

It is an object of the invention to provide a device for controlling the flow of a fluid through a conduit with an improved sealing arrangement.

When viewed from a first aspect, the invention provides a device for controlling the flow of fluid through a conduit from an upstream side of the device to a downstream side of the device, the device comprising:
    a casing;
    a valve seat mounted on the casing, the valve seat defining a valve aperture;
    a mounting member arranged on the downstream side of the valve aperture;
    a valve member movably mounted on the mounting member, wherein the valve member is arranged to move reciprocally to selectively open and close the valve aperture, thereby controlling the flow of the fluid through the valve aperture;
    a seal retaining member, arranged adjacent the valve seat such that the seal retaining member and the valve seat together define a seal retaining groove; and
    a compliant seal arranged within the seal retaining groove for substantially sealing the valve aperture when the valve member is moved to close the valve aperture.

The present invention provides a device for controlling (e.g. pressure regulating) the flow of fluid through a conduit (e.g. in which the device is placed). The flow of fluid through the device is controlled between an upstream side of the device and a downstream side of the device, with a valve aperture of the device, for example, defining the boundary between the upstream and downstream sides. The flow of fluid through the valve aperture, and thus through the device from the upstream side to the downstream side, is controlled by a valve member that is movably mounted on a mounting member. The mounting member is arranged in the device downstream of the valve aperture (and thus preferably the valve member is arranged downstream of the valve aperture) and the valve member is arranged to move reciprocally on the mounting member to selectively open and close the valve aperture so that the flow of fluid through the valve aperture may be controlled.

A valve seat, mounted on a casing of the valve (that, e.g., surrounds the other components of the device), defines the valve aperture of the device. The valve seat and a seal retaining member together define a seal retaining groove in which a compliant (e.g. deformable) seal is located. The valve seat and the seal retaining member act to retain the compliant seal within the groove. The compliant seal is arranged, and acts, to substantially seal the valve aperture when the valve member is moved to close the valve aperture, e.g. by the valve member contacting the compliant seal on the valve seat.

In order to retain the seal within the groove, a fine tolerance may be required. The valve seat and the seal retaining member may be separate from the casing and therefore may be (and, in embodiments, are) machined individually. The valve seat and the seal retaining member may be substantially smaller than the casing. This helps to allow the groove for the seal to be machined to a fine tolerance. Were the groove to be defined by the casing (which is typically much larger than the valve seat and the retaining member), it is likely to be expensive and complex to machine the casing to define the groove to the required tolerance. In embodiments of the present invention, the casing may be fabricated to a looser tolerance than the valve seat and the seal retaining member.

The removal of the requirement for the casing to maintain fine tolerances may allow the casing to be manufactured from a less expensive (and thus, potentially, a less corrosion-resistant) material, such as ductile iron, and coated in order to prevent corrosion. This is a variable process where fine tolerances may be more difficult to be held. The casing may be fabricated from uncoated stainless steel.

The fluid flow control device of the present invention may be any suitable and desired such device that is configured to control the flow of fluid therethrough. The device may comprise a pressure reducing valve. Thus the device may be arranged to control the flow of fluid through the valve aperture to induce a pressure drop in the fluid, e.g. from the upstream side to the downstream side of the device. The device may comprise a pressure sustaining valve. Thus the device may be arranged to maintain a constant pressure upstream of the device. The fluid may be water.

The casing may be provided in any suitable and desired way, e.g. on which to mount the valve seat to define the valve aperture. In some embodiments the casing comprises a wall on which the valve seat is mounted. The (e.g. wall of the) casing may be attached to (and sealed against) the mounting member (e.g. at a downstream side of the mounting member). Connecting the casing (and thus the valve aperture), e.g. structurally and directly, to the mounting member helps to align the valve member precisely within the device and thus with respect to the valve aperture.

The casing may comprise a pipe section. The casing may be arranged to be fitted within a conduit, e.g. between an upstream section of the conduit and a downstream section of the conduit. The device may comprise a flange (e.g. arranged on (e.g. welded to) an outer surface of the casing) for connecting to an upstream or a downstream side of the conduit. The flange may be arranged on a downstream and/or an upstream end of the casing. Thus the device may comprise two flanges (at either end) for connecting to a conduit. The upstream and/or downstream flanges enable the device to be connected (e.g. bolted) to one or more corresponding flanges on the upstream and/or downstream sections of the conduit.

In some embodiments the mounting member is mounted (e.g. directly) to the casing. In some embodiments the mounting member is mounted to (e.g. the casing via) a (e.g. downstream) flange. This arrangement may help to simplify manufacture and construction of the device. In some embodiments the mounting member and the (e.g. downstream) flange are integral to one another. In some embodiments the mounting member and the flange are distinct parts.

The mounting member may be attached to the (e.g. downstream) flange. The mounting member may be fixedly mounted (e.g. bolted) to (e.g. a recess in) the (e.g. downstream) flange. Thus the device may be manufactured with a "split core", allowing the mounting member, flange and casing to be manufactured from smaller volumes of initial materials. This may be cheaper than manufacturing the core of the device from a single piece of material, which would require a larger starting volume and more complex manufacturing processes in order to achieve the required geometries.

In some embodiments the diameter of the (e.g. casing of the) device is between 5 cm and 190 cm. Thus the device may be suitable for connecting within a conduit having a diameter between 5 cm and 190 cm. The device may be configured for operation with water as the working fluid.

The valve aperture may be arranged with respect to the mounting member and the valve member, and to the conduit, in any suitable and desired configuration. In some embodiments the valve aperture lies in a plane perpendicular to the axis of the mounting member and thus, in some embodiments, also to the axis of the device. The valve aperture may be any suitable or desired shape. In some embodiments, the valve aperture is circular.

The casing may define an interior volume that substantially surrounds the mounting member and the valve member, e.g. the mounting member and the valve member are arranged in the interior volume of the casing.

The valve member is movably mounted on the mounting member such that it is able to move reciprocally on the mounting member, and thus with respect to the valve aperture. In some embodiments, the mounting member is cylindrical. In some embodiments, the valve member moves in a direction parallel to the axis of the (e.g. cylindrical) mounting member and, e.g. to the axis of the device and/or to the conduit, e.g. coaxial about the mounting member.

The device may comprise one or more bearing strips arranged between the mounting member and the valve member. The bearing strips may help to reduce the frictional forces opposing the movement of the valve member. In some embodiments the bearing strips are manufactured from PTFE. In some embodiments the bearing strips are mounted on the valve member. In some embodiments the bearing strips are mounted on the mounting member.

The device and the components thereof may be arranged in any suitable and desired way. In some embodiments the mounting member, the valve member and the valve aperture (and also preferably the device itself, as well, e.g., as the casing, the valve seat and the seal retaining member) are arranged coaxially with respect to each other about an axis. The mounting member, the valve member and the valve aperture (and also preferably the device itself, as well, e.g., as the casing, the valve seat and the seal retaining member) may be substantially rotationally symmetric about the axis.

In some embodiments, the axis extends in a direction collinearly with the general (average) direction of fluid flow through the valve aperture.

The axis of the device may be parallel to, e.g. collinear with, the axis of the conduit in which the device is arranged. It will be appreciated that this arrangement allows the device to be easily fitted within an existing pipe. Therefore no additional space may be required to house the device and it can be retro-fitted rapidly and at low cost in most sections of pipework or at most pipe joints without any significant alteration in the pipework. Devices in accordance the present invention can therefore significantly reduce the cost and work required to incorporate them into an existing system.

In some embodiments the valve member is mounted on the outside of the mounting member. In some embodiments, a bearing strip is provided between the valve member and the mounting member. This helps to reduce friction between the components that impede the movement of the valve member. In some embodiments the bearing strip is provided on the valve member. In some embodiments the bearing strip is provided on the mounting member.

The valve member and the mounting member may define between them a control volume. Thus the fluid flow control device may comprise a control volume defined between the mounting member and the valve member. The control volume may contain a control pressure arranged to bias the valve member towards the valve aperture. The device may comprise an arrangement for introducing a control pressure into the control volume.

Thus when the upstream pressure is low (e.g. lower than the control pressure), the valve member may move towards the valve seat to close the valve aperture, and when the upstream pressure is high (e.g. higher than the control pressure), the valve member may move away from the valve seat to open the valve aperture. Thus the valve member may be acted on by the pressure of the upstream side and the control pressure so as to be moved by the difference between these pressures.

In some embodiments the device comprises a spring arranged within the control volume to bias the valve member towards the valve aperture.

The device may comprise a valve seal arranged between the mounting member and the valve member. Thus the valve seal may be arranged to prevent fluid from leaking into the control volume from the interior volume of the device (e.g. the fluid flowing through the device) or vice versa. The valve seal may be manufactured from PTFE. The valve seal may be arranged between two bearing strips. The valve seal may be mounted on the valve member. In some embodiments, the valve seal is mounted on the mounting member.

The width (e.g. diameter) of a (e.g. (e.g. central) projection on a) distal (e.g. upstream) end of the valve member may be smaller than the width (e.g. diameter) of the valve aperture. This allows the (e.g. (e.g. central) projection on the) distal (e.g. upstream) end of the valve member to move within the valve aperture when the valve member is moved to close the valve aperture. The (e.g. perimeter of the) distal (e.g. upstream) end of the valve member may be arranged to abut the valve seat when the valve member is moved to close the valve aperture.

In some embodiments the valve seat extends radially inwards (e.g. into the interior volume of the device) from the casing. The valve seat may extend (e.g. completely) around the (e.g. inner perimeter (e.g. circumference) of the) casing. In some embodiments the valve seat has a substantially annular shape, e.g. defining therewithin the valve aperture. The valve seat may be directly mounted (e.g. welded) to the casing.

The casing may comprise a mounting flange (e.g. a protruding rim) extending radially inwards (e.g. into the interior volume of the device). The mounting flange may extend (e.g. completely) around the (e.g. inner perimeter (e.g. circumference) of the) casing. In some embodiments, the mounting flange comprises an annulus, e.g. defining a central bore. The mounting flange may be an integral part of the casing. In some embodiments the mounting flange may be separate to the casing. It may be affixed (e.g. welded, bolted) to the (inner surface of the) casing.

In some embodiments the valve seat is mounted on (e.g. an (e.g. upstream) surface of) the mounting flange. The valve seat may comprise a portion that protrudes radially further inwards (e.g. into the interior volume of the device) than the mounting flange. This portion of the valve seat may thus define the valve aperture.

The valve seat may provide a stop for the valve member when the valve member is moved to close the valve aperture. The valve seat may comprise a (e.g. downstream) valve-facing surface. The valve-facing surface may be arranged to abut a corresponding (e.g. upstream) surface of the valve member (e.g. radially outwards of a central projection on a distal end of the valve member) when the valve member is moved to close the valve aperture. In some embodiments the (e.g. downstream) valve-facing surface may be defined by the portion of the valve seat that radially protrudes further radially inwards (e.g. into the interior volume of the device) than the mounting flange.

The valve seat may be sealed against the casing, e.g. by a seal between the valve seat and the casing. In some embodiments the valve seat is sealed against the mounting flange of the casing.

The seal retaining member may be any suitable or desired shape. In some embodiments the seal retaining member is substantially circular. The seal retaining member may be substantially annular, e.g. defining a central bore. The seal retaining member may be substantially rotationally symmetric about the axis of the general (average) direction of fluid flow through the (e.g. valve aperture of the) device.

In some embodiments the valve seat at least partially defines a slot for receiving the seal retaining member. The slot may be at least partially defined by the (e.g. mounting flange of the) casing, e.g. together with the valve seat. For example, when the valve seat is mounted on the (e.g. mounting flange of the) casing, the valve seat and the (e.g. mounting flange of the) casing may together define (e.g. therebetween) the slot for receiving the seal retaining member.

In some embodiments the shape of the slot is complementary to the shape of the seal retaining member. The slot may be adjacent the (e.g. downstream) valve-facing surface of the valve seat that is arranged to abut the corresponding (e.g. upstream) surface of the valve member when the valve member is moved to close the valve aperture. The slot may extend (e.g. azimuthally, e.g. completely) around (e.g. a (e.g. outer) circumference of) the (e.g. valve-facing surface of the) valve seat.

The seal retaining member may be arranged (e.g. within the slot) such that it protrudes from a (e.g. downstream) surface of the valve seat relative to at least portion of the (e.g. downstream) surface of the valve seat (e.g. radially inwards of the seal retaining member) to which it is adjacent. Thus the seal retaining member may define an (e.g. radially outer) edge of the seal retaining groove.

The valve seat may comprise a lip arranged on the (e.g. downstream) valve-facing surface of the valve seat. The lip may be substantially circular. The lip may extend (e.g. azimuthally, e.g. completely) around (e.g. a (e.g. inner) circumference of) the valve seat. The lip may be arranged radially inwards of the (e.g. slot for receiving the) seal retaining member. The lip may define an (e.g. inner) edge of the seal retaining groove. Thus, the seal retaining member (e.g. arranged within the slot) and the lip of the valve seat may between them define the seal retaining groove.

In some embodiments the valve seat is mounted to (and, e.g. overlaps with) the (e.g. mounting flange of the) casing such that the (e.g. mounting flange of the) casing protrudes radially inward of a radially outward part of the slot for receiving the seal retaining member. This means that a portion of the (e.g. mounting flange of the) casing partially overlaps the slot, thus further defining the slot. The overlapping portion of the casing may define a bulbous portion of the slot (e.g. having a dimension (e.g. cross sectional area) that is greater than a corresponding dimension of a (e.g. downstream) opening of the slot).

The shape of the seal retaining member is preferably substantially complementary to the shape of the slot. Thus the seal retaining member may comprise a (e.g. complementary) bulbous portion (e.g. a (e.g. upstream) end (the bulbous portion) of the seal retaining member may have a dimension (e.g. cross sectional area) that is greater than a corresponding dimension of an intermediate (e.g. central) portion of the seal retaining member) arranged in the bulbous portion of the slot. The bulbous portion of the seal retaining member may be located within the bulbous portion of the slot, such that the seal retaining member is effectively retained within the slot.

The width (e.g. diameter) of the distal (e.g. upstream) end of the valve member may be such that the (e.g. outer perimeter of the distal end of the) valve member partially overlaps a radially inward portion of a downstream surface of the seal retaining member when the valve member is moved to close the valve aperture. Thus, for example, when the valve member is moved to close the valve aperture, the (e.g. outer perimeter of the distal end of the) valve member may fully overlap the compliant seal.

The (e.g. inner perimeter of the) (e.g. mounting flange of the) casing may be radially outward of the (e.g. outer perimeter of the distal (e.g. upstream) end of the) valve member such that, when the valve member is moved to close the valve aperture, a gap is defined between the valve member and the (e.g. mounting flange of the) casing. This gap may be in fluid communication with the fluid downstream of the valve aperture.

In some embodiments, the valve member (and, e.g., the seal retaining member, the valve seat and/or the casing) is arranged such that, when the valve member is moved to close the valve aperture, the radially inward portion of the downstream surface of the seal retaining member is in contact with the valve member and an outer portion of the downstream surface of the seal retaining member is exposed to the fluid downstream of the valve aperture.

In some embodiments, the seal retaining member is (e.g. slightly) smaller than the slot within which the seal retaining member is arranged. Thus, in some embodiments, a leak path is defined between the seal retaining member and the (e.g. mounting flange of the) casing, and between the seal retaining member and the valve seat. Preferably the leak path extends around the perimeter of the seal retaining member such that fluid communication is established between fluid downstream of the valve aperture and a rearward surface of the compliant seal. The rearward surface of the seal may be substantially opposite a contact surface of the seal. The contact surface of the seal may be arranged to contact the valve member when the valve member is moved to close the valve aperture. The provision of a gap between the outer perimeter of the valve member and the casing, as described above, may improve this fluid communication between the downstream fluid and the rearward surface of the seal.

The presence of such a leak path means that low pressure from downstream of the valve aperture can be fed to the rearward surface of the compliant seal, thus reducing the pressure differential acting across the seal that acts to withdraw the seal from the groove. By reducing this pressure differential, the seal is less likely to be withdrawn from the groove. The provision of the seal retaining member as a part that is separate from the valve seat and the casing allows such a leak path to be defined without requiring additional complex manufacturing operations to be carried out on the casing. This reduces the complexity of manufacturing the device.

The compliant seal may protrude from the seal retaining groove such that, when the valve member is moved to close the valve aperture, the valve member contacts the compliant seal first, e.g. before the valve member contacts the valve seat.

The compliant seal may be substantially circular, e.g. annular. The seal may extend (e.g. azimuthally, e.g. completely) around the seal retaining groove and thus around the valve aperture. The seal may be any suitable and desired type of seal. Thus the seal may be made from any suitable and desired (e.g. deformable) material. The seal material may have a Young's Modulus that is less than that of the material of the valve member (and/or of other components). Thus, the seal may deform substantially before the valve member (and/or the other components). In one embodiment the compliant seal comprises an elastomer, e.g. nitrile, seal. In one embodiment the seal comprises polytetrafluoroethylene (PTFE), polyurethane, ethylene propylene diene monomer (EPDM) rubber or FKM (aka Viton). Such materials may help to allow the valve member to form an effective seal between the upstream and downstream sides of the valve aperture.

The seal may be located within a wake region of the flow through the device. This is where the flow velocity is significantly lower than the velocity of the fluid flowing through the centre of the valve aperture, as a result of flow separation from a surface upstream of the region. This may be on a downstream surface of the valve seat. Arranging the seal within a wake region means that particles, suspended within the fluid, that may come into contact with the seal have less kinetic energy and are therefore less likely to damage the seal. Damage to the seal can lead to the valve member being unable to form an effective (e.g. complete) seal when required, e.g. at shut-off. Reducing the risk of this damage can therefore improve the function of the device and reduce the frequency with which maintenance of the sealing arrangement is required, which can lengthen the lifetime of the device.

The (e.g. lip of the) valve seat and the seal retaining member may be shaped such that the seal retaining groove is substantially triangular (e.g. in cross-section). In some embodiments, the seal retaining groove is a dovetail groove. The dovetail groove may be a standard (e.g. approximately 66°) dovetail O-ring groove. The dovetail shape enables the seal to be more effectively retained within the groove. The cross-section of the compliant seal may be complementary to the cross-section of the seal retaining groove.

In order to manufacture the device such that the groove is able to tightly accommodate the seal, thereby allowing the seal to be more easily retained within the groove, the components that define the groove may need to be machined to fine tolerances. Were the groove to be defined by the casing of the device alone, which may be relatively large, the casing would need to be machined to this fine tolerance. Owing to the size of the casing, this could incur significant manufacturing costs. The valve seat and/or the seal retaining member may be significantly smaller (e.g. in terms of its enveloping dimensions) than the casing. This means that the valve seat and/or the seal retaining member may be manufactured to a finer tolerance than the casing, without incurring excessive manufacturing costs.

Therefore, defining the seal retaining groove by smaller components (i.e. the valve seat and the seal retaining member) allows the required tolerances to be achieved at a reduced cost.

A preferred embodiment of the invention will now be described, by way of example only, with reference to the accompanying drawings in which.

There are many different industrial situations in which there is a desire to control the flow rate in a fluid flow stream through a conduit. In such systems, a device is required to control the output flow rate by opening and/or closing an outlet (e.g. valve) aperture. As will now be described, embodiments of the present invention provide devices that are able to provide this control for the fluid flow.

Figure 1:
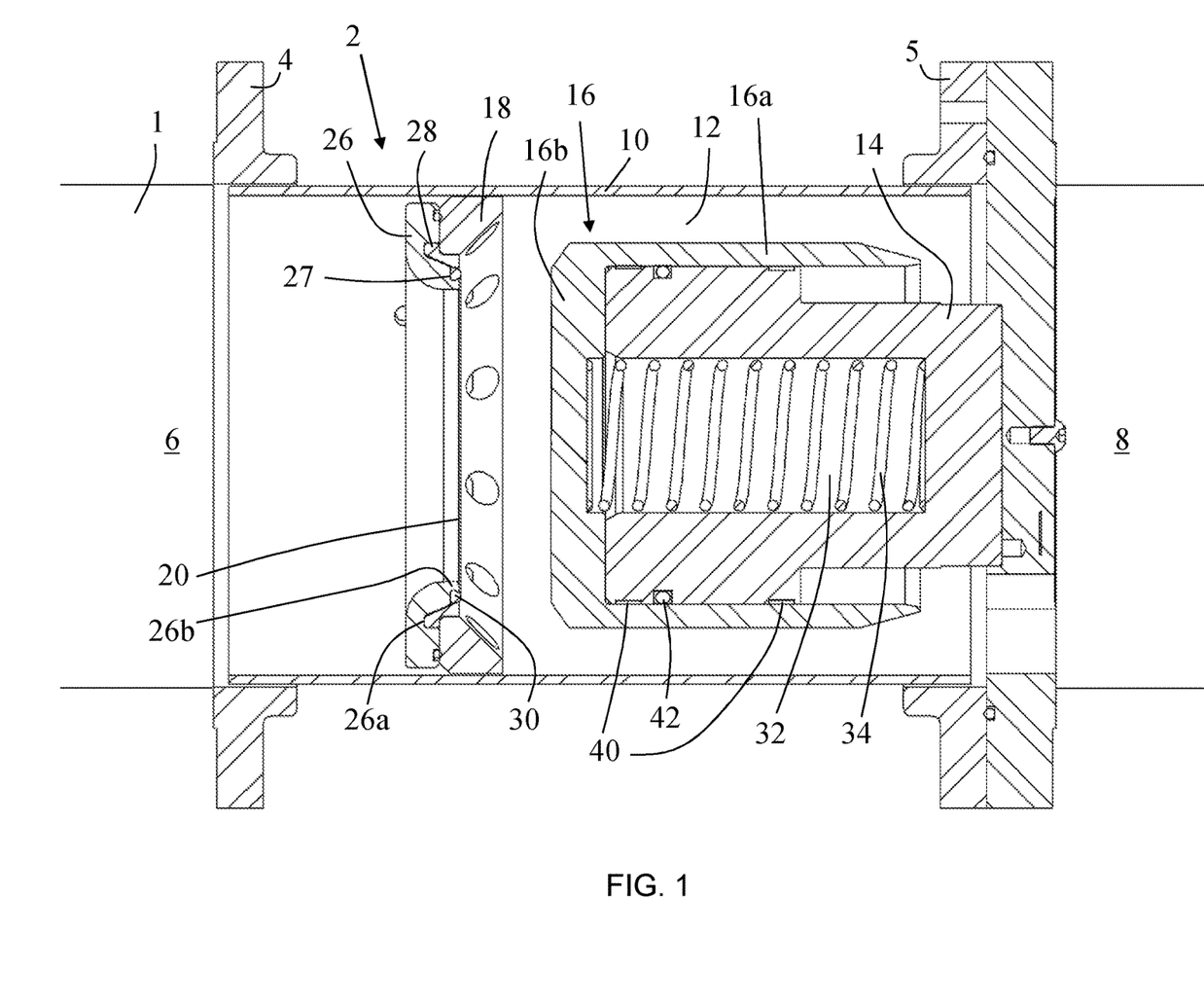
FIG. 1 shows a cross sectional view of the a device in accordance with an embodiment of the invention in an open configuration.

FIG. 1 shows a cross sectional view of a fluid flow control device 2 in accordance with an embodiment of the present invention. The device 2 comprises a casing 10 that is fabricated from ductile iron and then coated in order to prevent corrosion. The casing 10 comprises flanges 4, 5 on the upstream and downstream sides of the device 2 respectively for mounting the device 2 between an upstream side 6 and a downstream side 8 of a conduit 1 (e.g. having respective flanges against to mount the flanges 4, 5 of the casing 10). In FIG. 1, the fluid flow is from left to right from the upstream side 6 of the conduit 1, through the device 2 and into the downstream side 8 of the conduit 1.

The casing 10 defines a cylindrical inner volume 12 that is in fluid communication with the upstream side 6 and the downstream side 8 of the conduit 1. The casing 10 comprises a mounting annulus 18 that projects radially from the casing 10 into the inner volume 12.

The device 2 further comprises a cylindrical mounting member 14 and a valve member 16 mounted on the mounting member 14. The mounting member 14 and valve member 16 are located within the inner volume 12 of the casing 10. The mounting member 14 projects perpendicularly in the upstream direction from the downstream flange 5.

The valve member 16, which has a cylindrical sheath portion 16a and an end cap 16b, is mounted on the outside of the mounting member 14 such that it is able to move reciprocally along the outer surface of the cylindrical mounting member 14. The outer surface of the mounting member 14 comprises bearing strips 40 for improving the movement of the valve member 16 along the outer surface of the mounting member 14, The mounting member 14 defines a central bore 32. A helical spring 34 is arranged within the central bore 32 between the downstream inner surface of the central bore 32 and the inner surface of the end cap 16b. Thus, the spring 34 is arranged to bias the valve member 16 in the upstream direction. The outer surface of the mounting member 14 defines a groove in which an O-ring 42 is located to provide a seal between the downstream side 8 of the conduit 1 and the central bore 32.

The device 2 further comprises a valve seat 26 and a seal retaining member 28, both located within the inner volume 12 of the casing 10 upstream of the cylindrical mounting member 14. The valve seat 26 is coaxially mounted (e.g. bolted) to the upstream surface of the mounting annulus 18 and defines a central valve aperture 20. The downstream surface of the valve seat 26 comprises a circumferential first groove 26a in which the seal retaining member 28 is mounted. The valve seat 26 further comprises a lip 26b that protrudes from the downstream face of the valve seat 26. The seal retaining member 28 and the lip 26b together define a second dovetail O-ring groove 27 that faces downstream.

The valve seat 26 is arranged such that the valve aperture 20 is aligned with the valve member 16. The valve member 16 can thus move between a position in which the outer face of the end cap 16b is sealed against the downstream surface of the valve seat 26 to fully close the valve aperture 20, and a position in which the inner face of the end cap 16b abuts the end of the mounting member 14 (although the spring force exerted by the spring 34 may be arranged to prevent this).

A compliant seal 30 is located within the second groove 27 and projects beyond the surface of the downstream face of the valve seat 26. Thus, when the valve member 16 approaches the downstream surface of the valve seat 26, it contacts the seal 30 first.

In order to reduce the risk of damage to the seal 30 by particles within the flow, the seal 30 is arranged on a downstream-facing surface of the valve seat 26. This ensures that, over a substantial portion of the operating range of the device 2, the seal 30 is within a wake region where the flow velocity is significantly lower than the velocity of fluid passing through the valve aperture 20. As a result, any suspended particles which come into contact with the seal 30 have less kinetic energy and are therefore less likely to damage the seal 30.

In order to sufficiently retain the seal 30 within the groove 27, the valve seat 26 and the seal retaining member 28 are manufactured with fine tolerances. As the seal 30 is retained by these smaller components 26, 28 rather than by the larger casing 10, the casing 10 may be fabricated with much lower tolerances.

This means that the casing 10 can be coated in order to prevent corrosion. The coating process is not typically practicable when fine tolerances are required. The ability to coat the casing 10 allows the casing 10 to be manufactured from ductile iron, which is relatively inexpensive. This reduces the manufacturing costs associated with the casing 10 whilst enabling a groove 27 of the required tolerances to be manufactured.

In operation, the upstream pressure of a flow of fluid flowing through the conduit 1 acts on the upstream surface of the end cap 16b, thus exerting a force on the valve member 16 in the downstream direction against the bias of the spring 34. In some embodiments, a control pressure may be supplied to the central bore 32 via a control pressure feed (not shown) to increase the downstream force on the valve member 16. If the force exerted by the upstream fluid pressure is greater than the opposing force of the spring 34 (and, in some embodiments, the control pressure), the valve member 16 is moved into its open configuration, as shown in FIG. 1.

Figure 2:
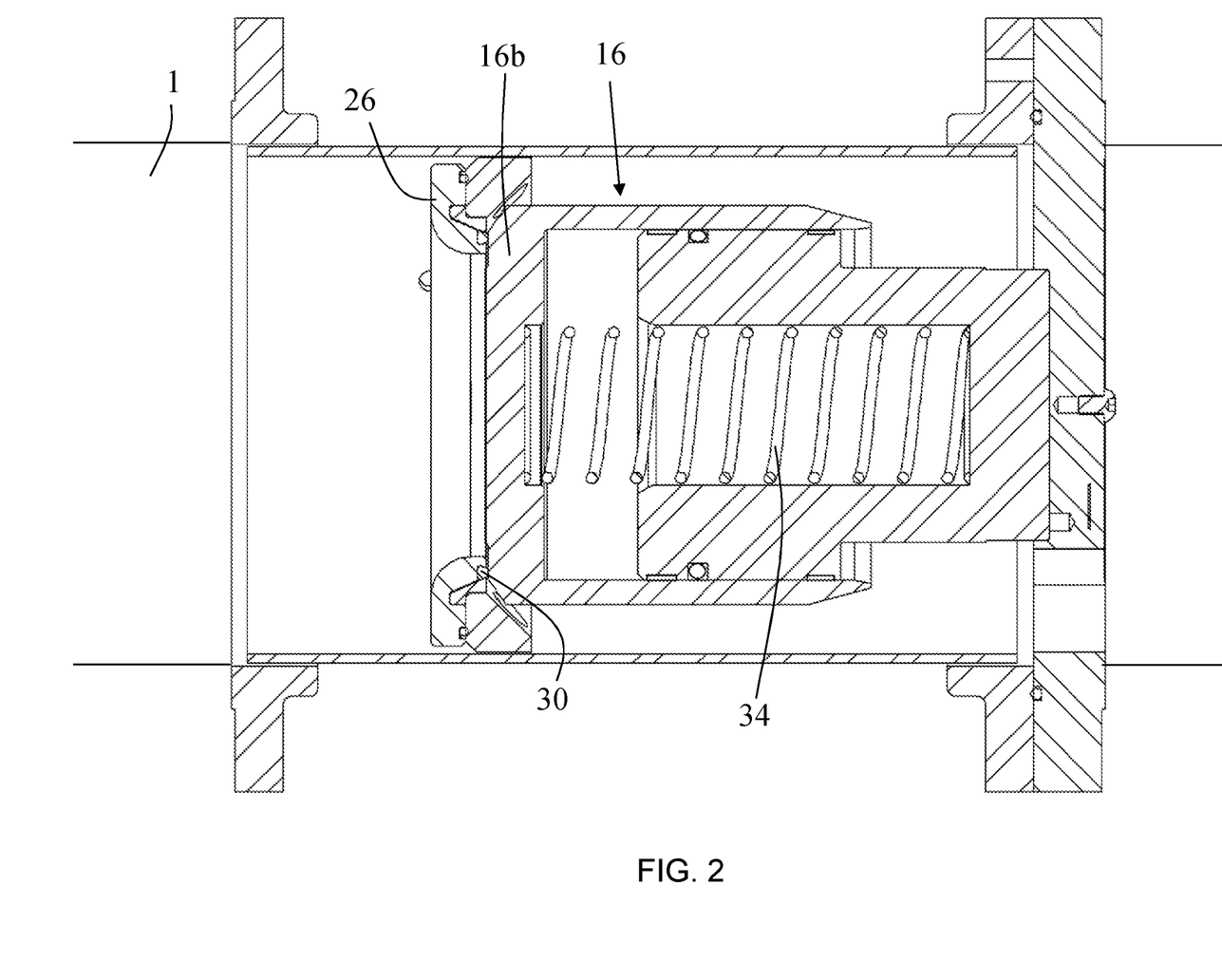
FIG. 2 shows a cross sectional view of the device of FIG. 1 in a closed configuration.

If the upstream fluid pressure decreases such that the force exerted by the upstream fluid pressure on the end cap 16b is lower than the opposing force of the spring 34 (and, in some embodiments, the control pressure), the valve member 16 is moved into its closed configuration, as shown in FIG. 2. In the closed configuration, the end cap 16b of the valve member 16 is sealed against the valve seat 26 by the seal 30.

Figure 3:
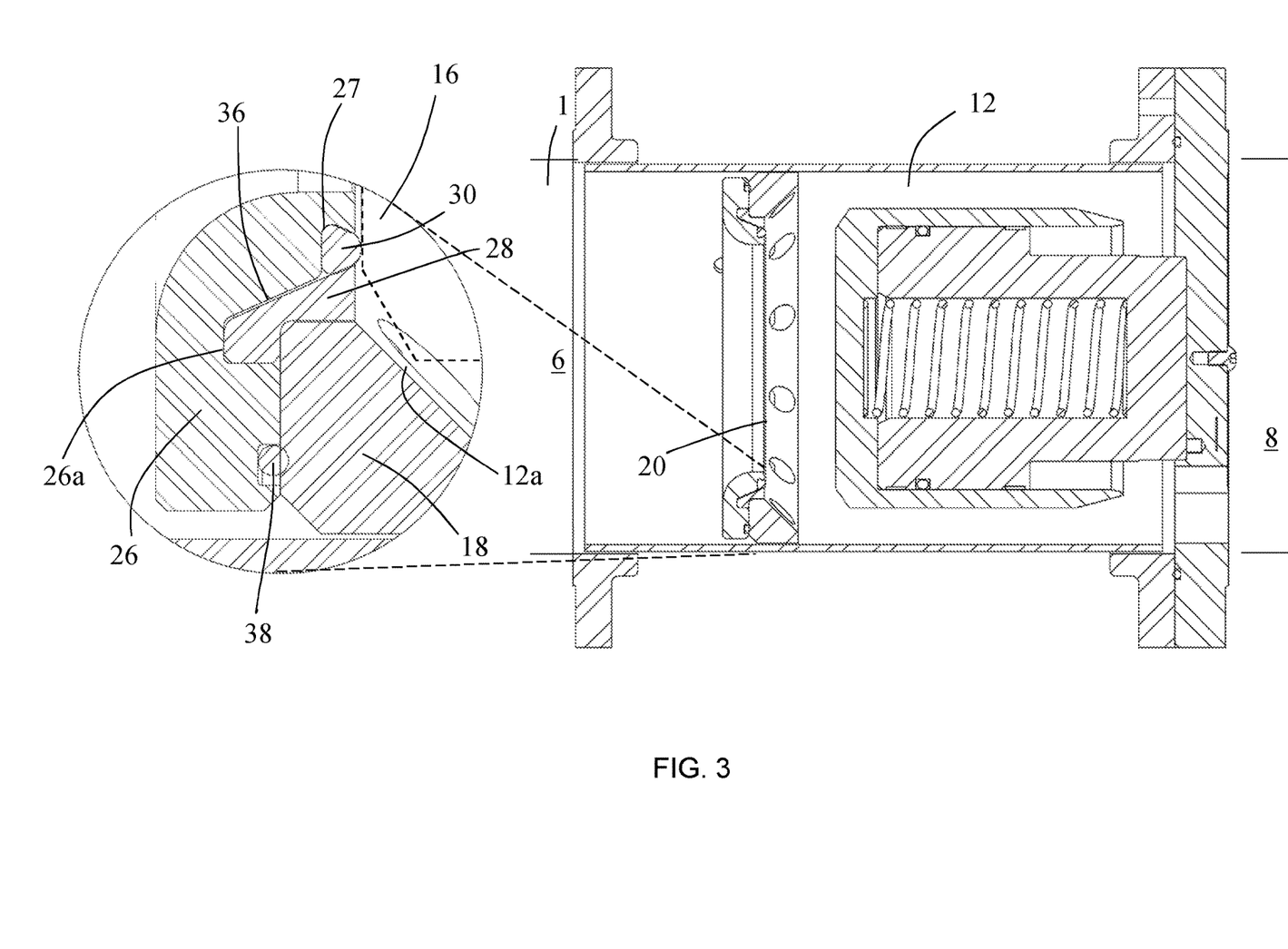
FIG. 3 shows a close-up cross sectional view of the sealing arrangement of the device of FIG. 1.

FIG. 3 shows a close-up cross sectional view of the seal 30, the mounting annulus 18, the valve seat 26 and the seal retaining member 28.

The mounting annulus 18 extends into the inner volume 12 of the casing 10 to a point at a radial distance from the inner surface of the casing 10. As will be seen in FIG. 3, the first groove 26a is defined by the valve seat 26 at a similar radial distance from the inner surface of the casing 10 such that the mounting annulus 18 partially overlaps the first groove 26a, thus forming a step 18a that further defines the groove 26a. FIG. 3 shows that the cross section of the seal retaining member 28 comprises a bulbous end, similar to a tab of a jigsaw puzzle piece, that is arranged to fit within a complementary portion of the first groove 26a, defined between the valve seat 26 and the mounting annulus 18. The interlocking geometries of these components help to secure the seal retaining member 26 within the groove 26a.

The position of the valve member 16 when in the closed configuration is indicated in the close-up cross section of FIG. 3 by a dotted line. The outer diameter of the distal end of the valve member 16 is smaller than the inner diameter of the mounting annulus 18 such that a gap 12a is defined between the valve member 16 and the mounting annulus 18. The compliant seal 30 is arranged radially inwards from this gap 12a and therefore serves to ensure that there is no fluid communication between the gap 12a and the upstream side 6 of the conduit 1.

The valve seat 26 and the seal retaining member 28 are machined such that a fluid flow path 36 is defined around the perimeter of the seal retaining member 28, within the first groove 26a. The fluid flow path 36 is in fluid communication with the gap 12a and consequently establishes fluid communication between low pressure fluid in the inner volume 12 downstream of the valve aperture 20 and the seal groove 27. The introduction of low pressure to the seal groove 27, behind the seal 30, reduces the differential pressure acting across the seal 30, thus reducing the risk of the seal 30 being withdrawn from the groove 27. As this flow path 36 is defined by the valve seat 26 and the seal retaining member 28, the requirement for a separate flow path to be machined (e.g. in the casing) to introduce low pressure behind the seal 30 is removed.

The sealing arrangement shown in FIG. 3 further comprises an O-ring 38, arranged radially outwards of the seal retaining member 18 to provide a seal between the valve seat 26 and the mounting annulus 18. This ensures that, when the valve member 16 is in the closed configuration, there is no leakage of fluid from the upstream side 6 of the conduit 1 to the downstream side 8 of the conduit 1 via the fluid flow path 36.

It can be seen from the above that, in at least preferred embodiments of the invention, the device comprises a seal arrangement that may be machined to the high tolerances required to retain a compliant seal effectively, without requiring expensive and complex machining of the valve casing. This helps to reduce the costs associated with manufacturing the device, as it allows the casing of the device to be fabricated from a less expensive material and to a lower tolerance. Manufacturing the seal arrangement from a number of smaller components additionally allows a flow path to be defined that introduces a downstream pressure to the rear side of the seal, thus reducing the pressure differential across the seal and reducing the risk of the seal being withdrawn from the seal arrangement.

The invention claimed is:

1. A device for controlling the flow of fluid through a conduit from an upstream side of the device to a downstream side of the device, the device comprising:
   a casing;
   a valve seat mounted on the casing, the valve seat defining a valve aperture;
   a mounting member arranged on the downstream side of the valve aperture;
   a valve member movably mounted on the mounting member, wherein the valve member is arranged to move reciprocally to selectively open and close the valve aperture, thereby controlling the flow of the fluid through the valve aperture;
   a seal retaining member, arranged adjacent the valve seat such that the seal retaining member and the valve seat together define a seal retaining groove; and
   a compliant seal arranged within the seal retaining groove for substantially sealing the valve aperture when the valve member is moved to close the valve aperture;
   wherein the valve seat and the casing together define a slot for receiving the seal retaining member, and wherein the seal retaining member is smaller than the slot within which the seal retaining member is arranged, thereby defining a leak path between the seal retaining member and the casing, and between the seal retaining member and the valve seat.

2. The device as claimed in claim 1, wherein the casing comprises a pipe section.

3. The device as claimed in claim 1, wherein the device comprises an upstream flange arranged on an outer surface of the casing for connecting to the upstream side of the conduit and/or a downstream flange arranged on an outer surface of the casing for connecting to the downstream side of the conduit.

4. The device as claimed in claim 3, wherein the mounting member is attached to the downstream flange.

5. The device as claimed in claim 1, wherein the device comprises one or more bearing strips arranged between the mounting member and the valve member.

6. The device as claimed in claim 1, wherein the casing comprises a mounting flange extending radially inwards, wherein the valve seat is mounted on the mounting flange.

7. The device as claimed in claim 1, wherein the valve seat comprises a valve-facing surface arranged to abut a corresponding surface of the valve member when the valve member is moved to close the valve aperture.

8. The device as claimed in claim 1, wherein the valve seat is mounted to the casing such that the casing protrudes radially inward of a radially outward part of the slot for receiving the seal retaining member to define a bulbous portion of the slot, wherein the seal retaining member comprises a bulbous portion arranged in the bulbous portion of the slot.

9. The device as claimed in claim 1, wherein the seal retaining member is arranged such that it protrudes from a surface of the valve seat relative to at least a portion of the surface of the valve seat to which it is adjacent, thereby defining an edge of the seal retaining groove.

10. The device as claimed in claim 1, wherein the valve seat comprises a lip arranged on a valve-facing surface of the valve seat, thereby defining an edge of the seal retaining groove.

11. The device as claimed in claim 1, wherein a width of a distal end of the valve member has an outer perimeter that partially overlaps a radially inward portion of a downstream surface of the seal retaining member when the valve member is moved to close the valve aperture.

12. The device as claimed in claim 1, wherein the casing is radially outward of the valve member such that, when the valve member is moved to close the valve aperture, a gap is defined between the valve member and the casing.

13. The device as claimed in claim 1, wherein the valve member is arranged such that, when the valve member is moved to close the valve aperture, a radially inward portion of a downstream surface of the seal retaining member is in contact with the valve member and an outer portion of the downstream surface of the seal retaining member is exposed to fluid downstream of the valve aperture.

14. The device as claimed in claim 1, wherein the seal is located within a wake region of the fluid flow through the device.

15. The device as claimed in claim 1, wherein the valve seat and the seal retaining member are shaped such that the seal retaining groove is substantially triangular or dovetail shaped in cross-section.

* * * * *